B. THOMPSON & C. SELDEN.
Application of the Condenser to Multiple Telegraphs.
No. 8,889. Reissued Sept. 9, 1879.
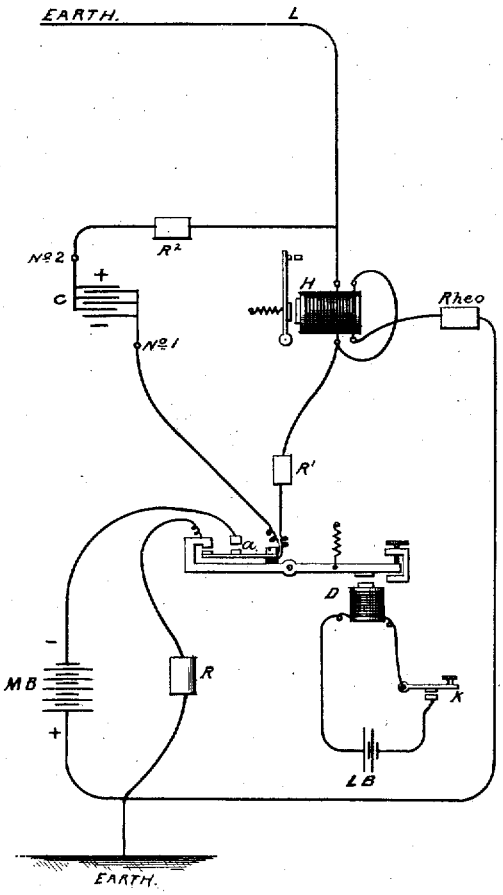
Witnesses;
T. Walter Fowler
R. K. Evans
Inventors
Benj. Thompson
Chas. Selden
by their attys
A. H. Evans & Co
THE NORRIS PETERS CO., PHOTO-LITHO., WASHINGTON, D. C.

UNITED STATES PATENT OFFICE.

BENJAMIN THOMPSON AND CHARLES SELDEN, OF TOLEDO, OHIO.

IMPROVEMENT IN APPLICATION OF THE CONDENSER TO MULTIPLE TELEGRAPHS.

Specification forming part of Letters Patent No. 217,304, dated July 8, 1879; Reissue No. 8,889, dated September 9, 1879; application filed August 9, 1879.

*To all whom it may concern:*

Be it known that we, BENJAMIN THOMPSON and CHARLES SELDEN, of Toledo, county of Lucas, State of Ohio, have invented a new and useful Application of the Condenser to Multiple Telegraphs; and we do declare the following to be a true and accurate description thereof, reference being had to the accompanying drawings, and to the letters of reference marked thereon, in which is shown the sending end of the line with the other or receiving end to earth.

The nature of this invention relates to the application of the condenser to multiple telegraphs, by which means the static charge of the line may be fully neutralized, and also the reversals of battery from distant station, when working multiple telegraphs, are hereby bridged over on the receiving-relays; and it consists in the peculiar arrangement of the condenser, in combination with resistance-coils, substantially as hereinafter described.

In the drawings, L B is a local battery; M B, a main battery; D, a duplex transmitter; Rheo, a set of resistance-coils; H, a differential relay; C, a condenser in a shunt of the main line around the relay. R $R^1$ $R^2$ are resistance-coils, and L the main line, grounded and marked "earth" at the receiving end; K, a Morse key.

When operator at key K closes his key, transmitter D becomes charged by local battery L B and places main battery M B to line through points *a* of transmitter. The battery, in passing to line, is rendered neutral on the differential relay H by the adjustment of rheostat, (marked Rheo,) which is so balanced that it shall oppose about the same opposition or resistance to the current from main battery M B as the line L does to the distant end of the line. Thus the outgoing current from the main battery is rendered neutral on the relay H. The current to the line passes in opposite direction to the current to the rheostat. Now, let the operator at key K withdraw the main battery from the line by opening his key. We now find that the line to distant end, being charged by the current sent into it, seeks to discharge itself the moment the operator withdraws the charging-current, and in discharging itself requires time. This is what is known as the "static charge" of a line. Now, the condenser C, being also charged at the time that the main line received its charge, also discharges itself instantaneously with the line through the same coil of relay H; but as the condenser discharges a current of an opposite polarity to that which the line discharges, and is adjusted to meet the static of the line, the static action on relay H is neutralized.

In charging the main line a small resistance-coil, $R^1$, is placed in the main line to assist in charging the condenser C; but this is not found necessary when the relay H is of a high resistance, or when working quadruplex, where the resistance of a second relay is sufficient to charge the condenser C. The resistance $R^2$ is inserted between the condenser and the line for the purpose of fully adjusting the condenser to meet the static charge, and the coils $R^2$ may be of any required resistances; or a series of condensers may be placed alongside of the one shown in the drawings, and also a series of resistances may be placed at $R^2$—that is, each condenser so used may be furnished with a separate resistance-coil.

By charging the line with main battery a minus current is sent out. Consequently the condenser C, Plate 1, becomes charged with a minus current, and Plate 2, by induction, receives a plus charge, so that when the line discharges it meets the charge from the condenser C, the line being minus and the condenser plus; and while the line and the condenser C have a charge of the same intensity, but of an opposite polarity, the effect on relay H is neutralized.

During reversals of battery from distant station, when working quadruplex or other multiple telegraphs, let distant end place battery to line, when the condenser C, Plate 2, receives a charge of the same polarity as battery placed to line. Now, let distant station reverse battery; the Plate 2 of condenser C discharges through home-relays, and maintains signals until the reverse battery-power has time to follow correctly.

This condenser method is found to be superior for neutralizing the static charge to that now in use, wherein the condenser is placed in the rheostat-circuit—that is, the condenser is placed around the rheostat in such a way that while the line discharges itself the condenser simultaneously discharges, but through a different coil of wire wrapped around the relay H, and in an opposite direction, while it is of the same polarity, so that the difference between the arrangement now in use and ours may be readily understood by those skilled in the science.

Having thus explained our invention, what we claim, and desire to secure by Letters Patent, is—

The application of the condenser C in a shunt of the main line around the relay or relays, in combination with resistances $R^1$ $R^2$, in a multiple telegraph, substantially as and for the purposes set forth.

BENJAMIN THOMPSON.
CHAS. SELDEN.

Attest:
GEO. H. BECKWITH,
RATHBUN FULLER.